(12) United States Patent
Norton

(10) Patent No.: US 8,500,132 B2
(45) Date of Patent: Aug. 6, 2013

(54) ROTATING COUPLING FOR ROBOTIC TOOL CHANGER WITH ONE-WAY CLUTCH AND DUAL-BUTTON HANDLE MECHANISM

(75) Inventor: Daniel Allen Norton, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 0 days.

(21) Appl. No.: 13/494,695

(22) Filed: Jun. 12, 2012

(65) Prior Publication Data

US 2012/0252646 A1    Oct. 4, 2012

Related U.S. Application Data

(63) Continuation-in-part of application No. 11/695,212, filed on Apr. 2, 2007, now Pat. No. 8,209,840, which is a continuation-in-part of application No. 12/554,543, filed on Sep. 4, 2009, which is a continuation-in-part of application No. 11/695,212, filed on Apr. 2, 2007, now Pat. No. 8,209,840.

(60) Provisional application No. 60/789,004, filed on Apr. 4, 2006.

(51) Int. Cl.
*B23B 31/22* (2006.01)

(52) U.S. Cl.
USPC ............. 279/71; 279/81; 279/140; 403/322.2

(58) Field of Classification Search
USPC ................ 279/2.19, 2.23, 29, 30, 71, 73, 81, 279/134, 140; 403/322.1, 322.2, 322.4; 439/348; 294/117, 204; 29/428
IPC ...................................................... B23B 31/22
See application file for complete search history.

(56) References Cited

U.S. PATENT DOCUMENTS

| 1,406,220 | A | * | 2/1922 | Pickett ............................ 279/81 |
| 2,134,199 | A | * | 10/1938 | Newton et al. ................ 220/86.4 |
| 2,408,689 | A | * | 10/1946 | Seme ................................ 33/573 |
| 2,470,256 | A | * | 5/1949 | McIlroy .......................... 285/277 |
| 3,822,951 | A | * | 7/1974 | Bornzin .......................... 403/316 |
| 4,231,581 | A | * | 11/1980 | Benedict ....................... 279/19.4 |
| 4,520,550 | A | * | 6/1985 | Dunn et al. ......................... 483/1 |
| 4,652,187 | A | * | 3/1987 | Regelsberger et al. ........ 408/240 |
| 4,660,274 | A | * | 4/1987 | Goumas et al. ................... 483/7 |
| 4,696,524 | A | * | 9/1987 | Cloyd ............................ 439/197 |
| 4,708,548 | A | * | 11/1987 | Taylor et al. .................. 409/234 |
| 4,775,269 | A | * | 10/1988 | Brix .......................... 408/239 R |
| 5,018,266 | A | * | 5/1991 | Hutchinson et al. .............. 483/1 |
| 5,044,063 | A | * | 9/1991 | Voellmer ......................... 483/59 |
| 5,211,501 | A | * | 5/1993 | Nakamura et al. .......... 403/322.3 |
| 6,073,512 | A | * | 6/2000 | McCormick et al. ........... 74/528 |
| 7,252,453 | B1 | * | 8/2007 | Little .......................... 403/322.2 |
| 2007/0235949 | A1 | * | 10/2007 | Gloden et al. ............... 279/2.12 |

* cited by examiner

*Primary Examiner* — Eric A Gates
(74) *Attorney, Agent, or Firm* — Coats & Bennett, P.L.L.C.

(57) ABSTRACT

A manual robotic tool changer provides a compact, lightweight means to manually selectively couple a robotic tool, such as a surgical tool, to a robot arm. The tool changer includes numerous safety features to prevent inadvertent decoupling of the robotic tool. These include a dual-button handle locking mechanism operative to lock the tool changer closed in the fully coupled position, and requiring simultaneous actuation of both of two latch buttons to unlock; a one-way clutch mechanism that prevents rotation of the coupling mechanism towards the decoupled position, unless the handle is actuated to unlock the tool changer; and a spring biasing the tool changer to an at least partially coupled state when no force is applied to the handle, thus requiring a positive force against the spring, moving the handle to a fully open position, to insert or remove a robotic tool.

22 Claims, 11 Drawing Sheets

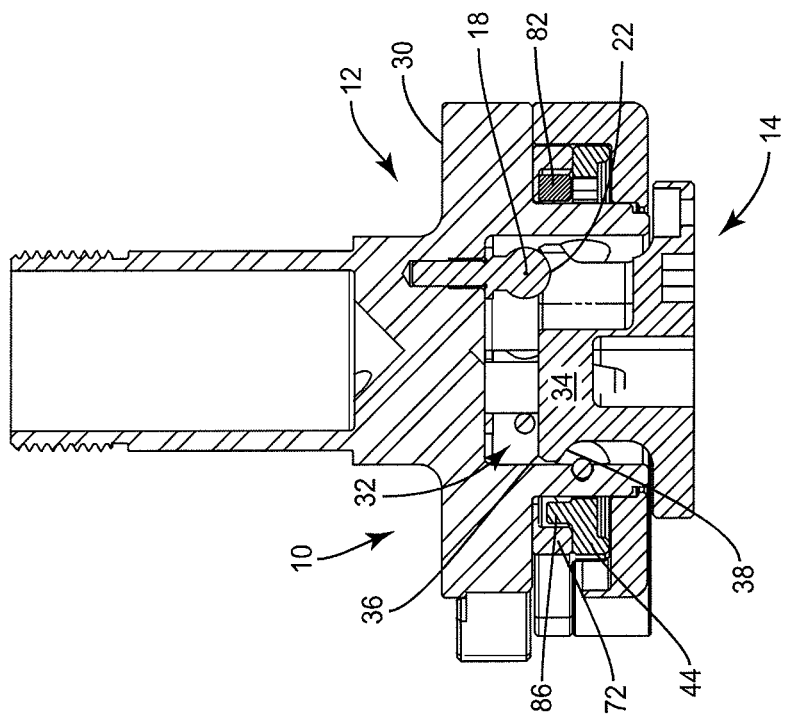
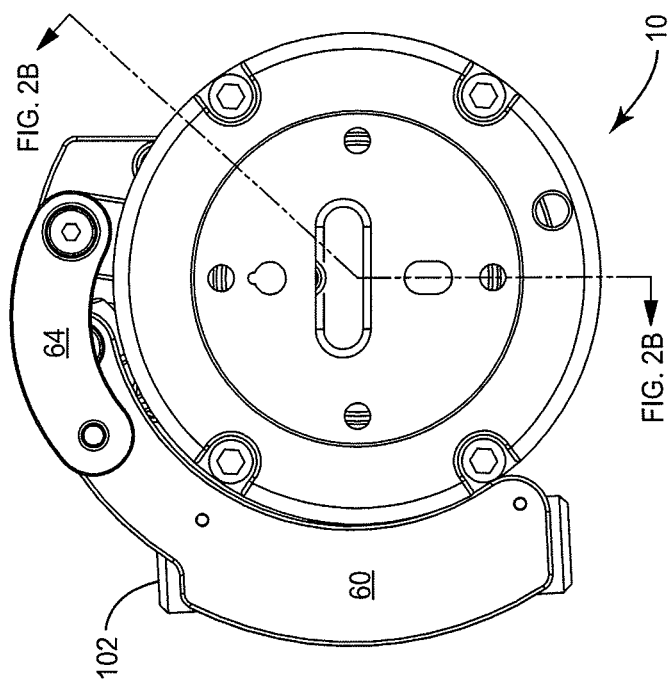

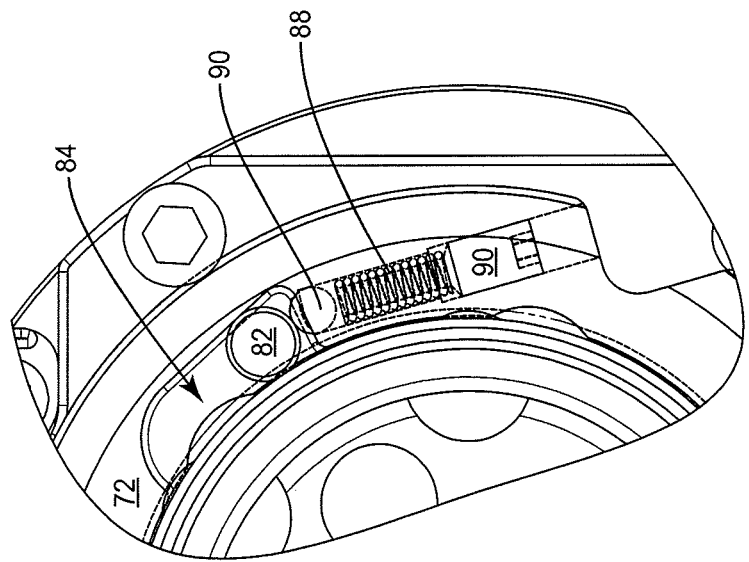
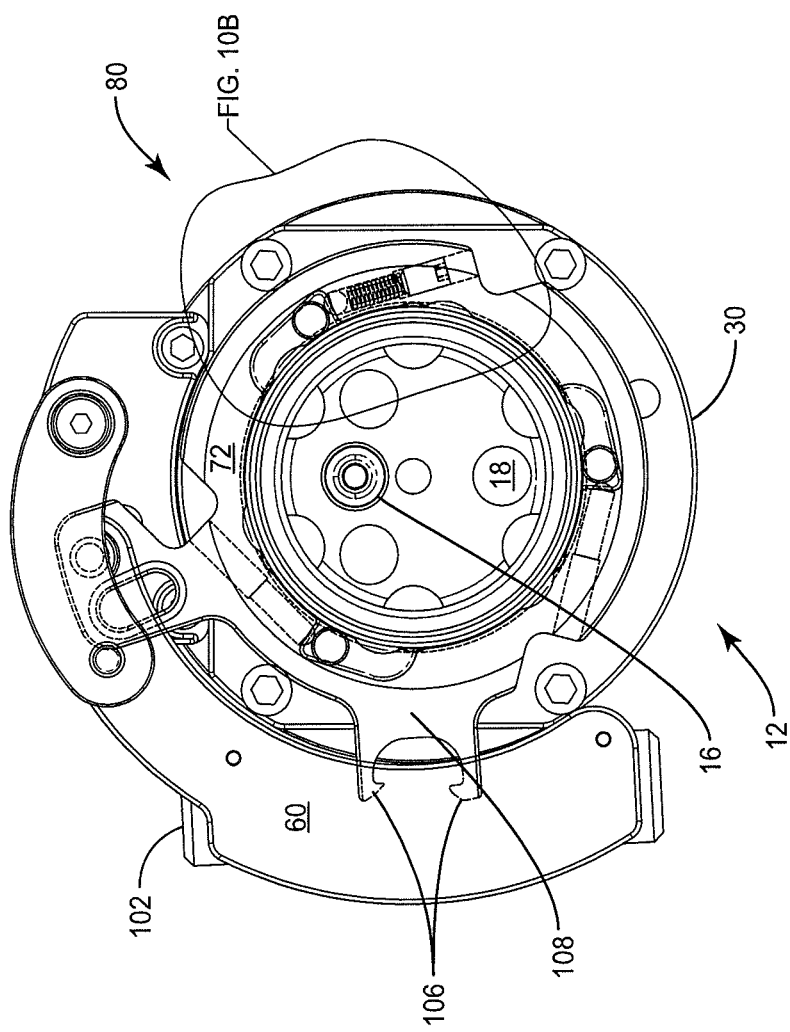
FIG. 10A
FIG. 10B

ROTATING COUPLING FOR ROBOTIC TOOL CHANGER WITH ONE-WAY CLUTCH AND DUAL-BUTTON HANDLE MECHANISM

This application is a Continuation-In-Part of U.S. patent application Ser. No. 11/695,212, filed Apr. 2, 2007, which claims priority to Provisional U.S. Patent Application 60/789,004 filed Apr. 4, 2006, entitled, "Rotating Coupling for Robotic Tool Changer." This application is also a Continuation-In-Part of U.S. patent application Ser. No. 12/554,543, filed Sep. 4, 2009, which is itself a Continuation-In-Part of U.S. patent application Ser. No. 11/695,212 filed Apr. 2, 2007. These three applications are incorporated herein by reference in their entireties.

FIELD OF INVENTION

The present invention relates generally to the field of robotics and in particular to a rotating coupling for a robotic tool changer having a one-way clutch mechanism operative to restrict relative motion and a handle featuring dual lock release buttons.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, the considerable cost of an industrial robot is amortized over a variety of tasks by providing different tools, or end effectors, that may be coupled to a general-purpose robotic arm. For example, in an automotive manufacturing application, a robot may be utilized to cut, grind, or otherwise shape metal parts during one production run, and perform a variety of spot welding tasks in another. Different welding tool geometries may be advantageously mated to a particular robot to perform welding tasks at different locations or in different orientations. In these applications, a tool changer is used to mate different tools to the robot.

One half of the tool changer, called the master unit, is permanently affixed to a robot arm. The other half, called the tool unit, is affixed to each tool that the robot may utilize. Utilities such as electrical current, air pressure, hydraulic fluid, cooling water, and the like, are fed through cables and plumbing down the robot arm, that terminate at the master unit. Similar cables and plumbing carry the utilities from the tool unit to the particular tool. When the tool changer halves are mated, the utilities are transferred across the changer and made available at the tool. A tool changer thus provides a standard mechanical interface for physically coupling a variety of tools to a robotic arm, as well as providing for the transfer of utilities. Utility and safety concerns dictate that the physical coupling between master and tool units of a robotic tool changer be robust and secure, even in the face of a power outage or loss of a utility such as pneumatic pressure.

While industrial robots tend to be large, highly automated devices, robotic tool couplers find utility in other applications. For example, in robot-assisted surgery, a relatively small robot arm positions surgical tools in a pre-defined "safe zone." Surgeons then operate using the tools, while the robot prevents the tools from moving outside of the pre-defined safe zone of operation. In such applications, due to size, weight, cost, and among other constraints to properly clean and sterilize the tool, it may be advantageous for tools to be attached, and for a robotic tool changer to be actuated (that is, or moved between coupled and decoupled states) manually.

The use of ball members, urged by a piston against an inclined surface, to lock the master and tool units together is known in the art. For example, U.S. Pat. No. 4,696,524 (incorporated herein by reference) discloses a plurality of ball members contained within the master unit, and circumferentially arranged around a central axis. Extending from the master unit, along this axis, is a piston member having an inclined surface operative to contact the ball members and urge them outwardly as the piston advances axially. The ball members contact a surface in the tool unit disposed at an angle such that outward force induced on the ball members by the piston generates an "upward" force component that presses the angled surface, and thus the entire tool unit, against the master unit.

U.S. Pat. No. 5,211,501 (incorporated herein by reference) discloses a similar piston and ball member arrangement, with an improved piston/ball member contact surface. This patent discloses a multifaceted contact surface comprising an initial tapered contact surface for first contacting the ball members and moving them outward and into contact with an angled surface of the tool unit. A flat—i.e., parallel with the piston axis—failsafe surface is adjacent the initial tapered surface. A tapered locking surface, at an angle with respect to the axis of less than that of the initial actuating surface, is adjacent the failsafe surface.

For the following discussion, assume the master unit is oriented over the tool unit, with the interface plane between the two modules parallel with the horizon. As the piston member advances axially (downwardly) into the tool unit, the initial contact surface contacts the ball members and moves them radially outward (horizontally) into the tool unit. At the extent of the piston's axial movement, the final tapered surface presses each ball member outwardly against an angled surface in the tool unit. This angled surface tapers inwardly, toward the piston axis, as it approaches the master unit. Each ball member, urged outwardly by the tapered locking surface of the piston member, presses against the tool unit angled surface with a resultant force that can be decomposed into horizontal (outward) and vertical (upward) components. The vertical component of force presses the tool unit upward and locks the tool unit to the master unit.

The ball members press inwardly against the piston with equal and opposite force. Since the tapered locking surface is angled with respect to the piston axis, the force exerted by each ball member is a resultant force that can also be decomposed into horizontal (inward) and vertical (upward) components. In the event of a loss of force actuating the piston, the vertical component of force exerted by the ball members urges the piston upwardly. As the piston moves upwardly, the balls are free to move inwardly, pressing with less force on the tool unit angled surface and tending to decouple the master and tool units. For safety, a failsafe surface is interposed between the piston initial contact surface and the tapered locking surface, both of which are tapered. The failsafe surface is vertical—i.e., parallel with the piston axis. During a power loss, force exerted by the ball members may move the piston slightly upwards, until the ball members contact the failsafe surface. Since the failsafe surface is vertical, the resultant force exerted by the ball members is normal, i.e., horizontal, and includes no vertical component. This prevents force from the balls on the piston from further retracting the piston into the master unit and further decoupling the modules, without some positive actuation of the piston in that direction. Accordingly, the tool unit remains coupled to the master unit when piston actuating power is lost.

U.S. Pat. No. 7,252,453 (incorporated herein by reference) discloses a similar piston and ball member arrangement, with a piston member contact surface having a tapered locking surface at an angle with respect to the axis greater than that of the initial actuating surface.

U.S. Pat. No. 8,005,570 (incorporated herein by reference) discloses a similar piston and ball member arrangement, with a piston member contact surface having a failsafe surface that includes a lip, or protrusion, which actively opposes retracting motion of the piston. When the master and tool units are coupled together—that is, when the ball members are fully extended by the tapered locking surface and pressing against the tool unit angled surface—the protrusion on the failsafe surface is past (below) the ball members. In the event of loss of piston actuating power, the force exerted by the ball members on the tapered locking surface tends to decouple the master and tool units, as described above. This tendency is neutralized by the failsafe surface being parallel to the piston axis, thus not supporting any component of force in the axial direction. The protrusion provides an additional assurance that the piston cannot retract into the master unit. Moving the protrusion past the ball members requires a positive retracting force on the piston, since the balls must momentarily be pressed yet further against the tool unit angled surface for the protrusion to pass. The protrusion may comprise a raised surface, or the lip of a depression in the failsafe surface into which the ball members nestle.

In all of the above examples, the ball members are moved outwardly against the tool unit's angled surface by axial motion of a piston. This requires sufficient room in the master tool unit above the piston to house the piston in the retracted position. If the ball members could be actuated outwardly and forced against the tool unit angled surface without requiring axial motion of a piston, the master tool unit may be designed with a more compact, lower profile shape. Additionally, the mating surfaces and other parts of all robotic tool changers wear with use, which may lead to slack or "slop" in fittings. Furthermore, particularly in a surgical tool application, positive locking of the robotic tool coupler, against inadvertent opening, is critical. However, any locking mechanism must be operative within the surgical environment, wherein most mechanical parts are covered with sanitary plastic shrouds.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure is not intended to identify key/critical elements of embodiments of the invention or delineate the scope of the invention. The sole purpose of this summary is to present some concepts disclosed herein in a simplified form as a prelude to the more detailed description that is presented later.

According to one or more embodiments disclosed and claimed herein, a manual robotic tool changer provides a compact, lightweight means to manually selectively couple a robotic tool, such as a surgical tool, to a robot arm. The tool changer includes numerous safety features to prevent inadvertent decoupling of the robotic tool. These include a dual-button handle locking mechanism operative to lock the tool changer closed in the fully coupled position, and requiring simultaneous actuation of both of two latch buttons to unlock; a one-way clutch mechanism that prevents rotation of the coupling mechanism towards the decoupled position, unless the handle is actuated to unlock the tool changer; and a spring biasing the tool changer to an at least partially coupled state when no force is applied to the handle, thus requiring a positive force against the spring, moving the handle to a fully open position, to insert or remove a robotic tool.

One embodiment relates to a manual robotic tool changer. The tool changer includes a first unit operative to be attached to one of a robot and a robotic tool, and a second unit operative to be attached to the other of the robot and a robotic tool, and further operative to be selectively coupled to and decoupled from the first unit. A plurality of ball members is disposed in the first unit. A rotating cam surface ring is disposed in one of the units and operative to engage the ball members in the first unit and to urge the ball members, by rotational movement of the rotating cam surface ring, against a coupling surface of the second unit to lock the first and second units together. A handle is operative to rotate the cam surface ring to couple and decouple the first and second units. A one-way clutch mechanism is operative to allow rotation of the cam surface ring in the coupling direction and to restrict rotation of the cam surface ring in the decoupling direction unless by actuation of the handle.

Another embodiment relates to a manual robotic tool changer. The tool changer includes a first unit including a coupling mechanism; a handle attached to the first unit and operative to activate the coupling mechanism; and a second unit operative to be selectively coupled to the first unit by manual actuation of the handle. The tool changer also includes a dual-button handle locking mechanism. The dual-button handle locking mechanism includes two latch buttons disposed on the handle in opposite directions, the latch buttons operative to be actuated by pressing them together; a locking tooth connected to each latch button; and two locking tabs connected to the first unit and operative to engage the locking teeth when the handle is pressed against the first unit so as to prevent the handle moving without actuation of both latch buttons to disengage the locking teeth from the locking tabs.

Yet another embodiment relates to a manual robotic tool changer. The tool changer includes a first unit including a coupling mechanism; a handle attached to the first unit and operative to activate the coupling mechanism; and a second unit operative to be selectively coupled to the first unit by manual actuation of the handle. The tool changer also includes a dual-button handle locking mechanism comprising two latch buttons disposed on the handle in opposite directions, the latch buttons operative to be actuated by pressing them together, a locking tooth connected to each latch button, and two locking tabs connected to the first unit and operative to engage the locking teeth when the handle is pressed against the first unit so as to prevent the handle moving without actuation of both latch buttons to disengage the locking teeth from the locking tabs. The tool changer further includes a one-way clutch mechanism in the coupling mechanism operative to allow the coupling mechanism to move in a coupling direction and to restrict the coupling mechanism from moving in a decoupling direction unless by actuation of the handle.

BRIEF DESCRIPTION OF DRAWINGS

FIG. 2A is a plan outline view of the tool changer of FIG. 1, showing the sectional lines for FIG. 2B.

FIG. 2B is a vertical sectional view of the tool changer of FIG. 1.

FIG. 10A is a horizontal sectional view of the master unit of FIG. 3 in a coupled position FIG. 10B is a detail of FIG. 10A more clearly showing a one-way clutch mechanism.

DETAILED DESCRIPTION

Figure 1:
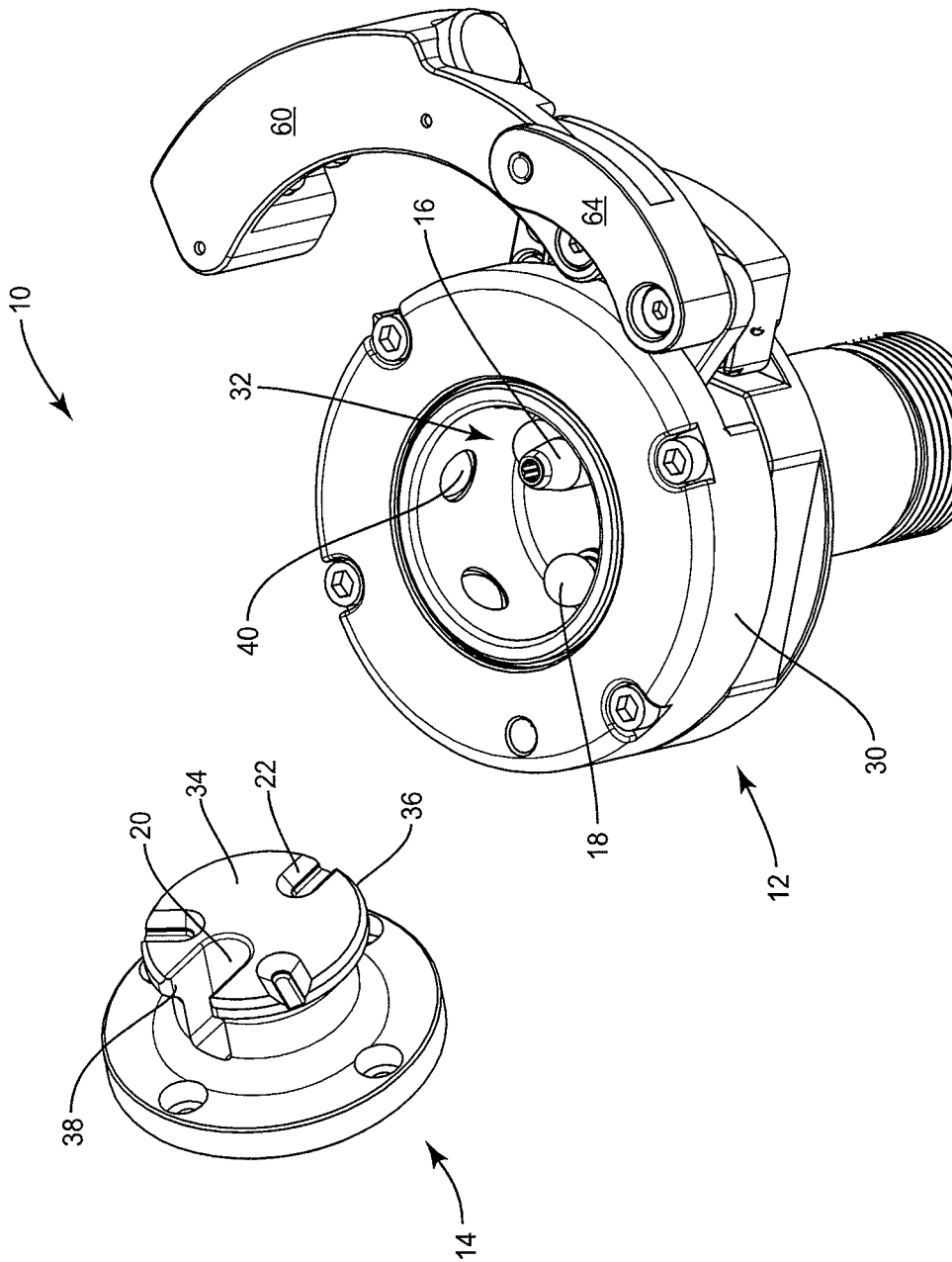
FIG. 1 is a perspective rendering of a manual handle-actuated robotic tool changer having a rotating coupling mechanism.

In the following discussion, reference is made to the drawing figures, in which the same parts and components are numbered consistently. In describing the movement or actuation of various components, directional terms such as up, left, clockwise, and the like, are used for clarity of explanation. These directional terms should be understood to apply only to a depiction in a particular drawing figure, clearly referenced in the description. In practice, of course, a robotic tool changer may assume any orientation, and directional terms used herein are not in any sense a limitation on the scope of the claimed invention.

According to one or more embodiments of the present invention, a rotating coupling mechanism couples the master and tool units of a robotic tool changer together, obviating the need for a piston that moves axially to achieve the coupling. The coupling mechanism includes a one-way clutch that restricts relative motion of various parts to reduce excessive wear. A latching mechanism on the handle is particularly suited for a robotic surgical application.

FIG. 1 depicts a robotic tool changer, indicated generally by the numeral 10. The robotic tool changer 10 comprises a master unit 12 adapted to be connected to a robotic arm (not shown) and a tool unit 14, adapted to be connected to a robotic tool (not shown).

In some embodiments, the robotic tool may comprise a surgical tool used in performing surgical operations on a patient (e.g., human or animal patient). Robotic surgical tools provide numerous advantages over conventional surgical techniques, in which all operations are performed by hand. Utilizing one or more alignment aids, the special orientation and alignment of the robotic surgical tool may be ascertained and controlled, in relation to the special orientation and alignment of the patient (or at least the area undergoing surgical treatment). Hard limits to the allowed motion of the robotic tool may then be imposed by software. This technique, sometimes known as "invisible walls" confines operation of the surgical tool to a predetermined area of the patient, dramatically reducing the risk of inadvertent damage to other areas.

Within the area of allowed movement (i.e., within the invisible walls), movement and actuation of the surgical tool may, in various applications, be controlled by a surgeon or other individual, may be pre-programmed and controlled by software, or some combination. A further advantage of robotic surgical tools is a decoupling of physical proximity between the surgeon and the patient, allowing for "distance" surgery.

The robotic tool changer 10 allows users to selectively attach different tools to a robotic arm by selectively coupling and decoupling the master unit 12 to different tool units 14. An alignment pin 16 and rigidly affixed alignment ball members 18 on the master unit 12 mate with a corresponding alignment slot 20 and recesses 22, respectively, on the tool unit 14, to ensure proper alignment of the master and tool units 12, 14 when the units are coupled together. Alignment pin 16 is long enough to allow a surgeon to pre-orient the tool "by feel" prior to coupling. This saves time and further reduces the risk of a tool drop in the operating room. Also, the rigidly affixed ball members 18 and their corresponding recesses 22 comprise what is known in the art as a "kinematic mount." A kinematic mount provides point contact surfaces that result in maximum repeatability. This is of a particular importance in providing reliable tool positioning in a surgical application.

In the embodiment depicted in FIG. 1, a tool attached to the tool unit 14, such as a surgical tool, is directly connected to various electrical, data, optical, pneumatic gas, or other supply/communication lines. In this embodiment, the robot provides a rigid mechanical mount and precise positioning and movement of the surgical tool. As is well known in the art, in other embodiments, various utilities may be passed through the robotic tool changer 10.

The master unit 12 includes a housing 30 having a circular chamber 32 formed therein. The tool unit 14 includes a protruding column 34, having a lip or protrusion 36 at the distal end thereof. As depicted in FIG. 1 and in the sectional view of FIG. 2, depicting the master unit 12 and tool unit 14 coupled together, the column 34 extends into the chamber 32 when the master and tool units 12, 14 are abutting. The protrusion 36 at the distal end of the column 34 defines a coupling surface 38 on the tool unit 14 side of the column protrusion 36. The coupling surface 38 may, in various embodiments, be a conical (i.e., flat, angled) surface or a curved surface, but in any event, is characterized by an increasing radius of the protrusion 36 in the axial direction of the column 34 towards the master unit 12.

Referring again to FIG. 1, a plurality of holes 40 is formed in housing 30 around the chamber 32, the holes 40 having generally even radial spacing around the circumference of the chamber 32. In one embodiment, the holes 40 are tapered, having a slightly smaller diameter at the surface of the chamber 32 than deeper within the housing 30. Disposed in each hole 40 is a ball member 42 (see FIG. 3). The ball members 42 are retained within the housing 30 by each tapered hole 40 having a diameter at the surface of the chamber 32 that is slightly less than the diameter of the corresponding ball member 42. Accordingly, the ball members 42 may move between a retracted (decoupled) position wherein the surface of each ball member 42 is at most flush with the surface of the chamber 32, and an extended (coupled) position wherein each ball member 42 extends past the annular surface of the housing 30 and into the chamber 32 by an amount slightly less than the radius of the ball member 42.

A rotating cam surface ring 44, depicted in FIGS. 3A, 3B, 4A, and 4B, is disposed within the annular portion of the housing 30 that defines the central chamber 32. The rotating cam surface ring 44 includes a plurality of recesses 46, with the number of recesses 46 corresponding to the number of ball members 42. Each recess 46 comprises a plurality of cam surfaces that actuate a ball member 42 between retracted and extended positions as the rotating cam surface ring 44 rotates about the axis of the chamber 32, when driven by the handle linkage member 64. As depicted in FIGS. 5-8, and described more fully herein below, each recess 46 includes a nesting surface 48, an actuating surface 50, a failsafe surface 54, and a locking surface 56 (not indicated in FIGS. 3A, 3B, 4A, and 4B).

Figure 3B:
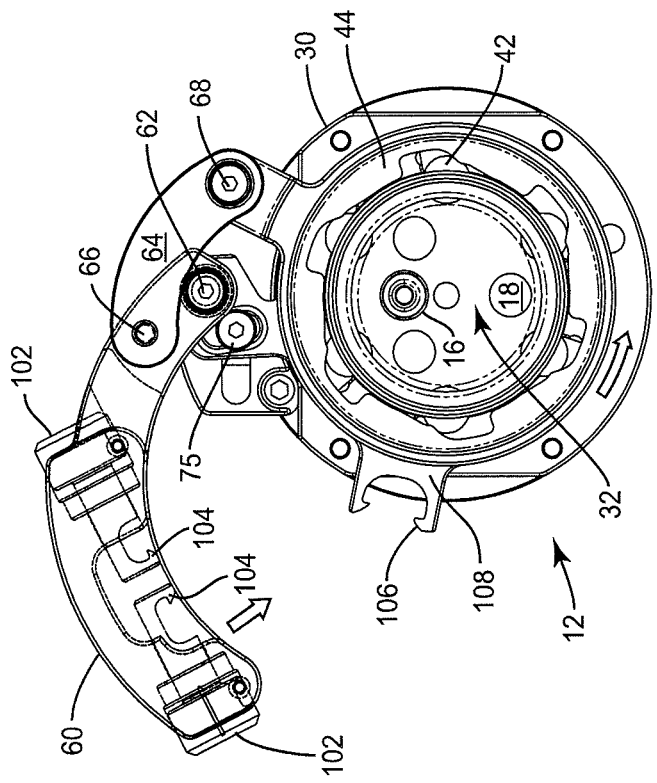
FIGS. 3A and 3B are horizontal sectional views of the master unit of the tool changer of FIG. 1 in a decoupled position.
Figure 3A:
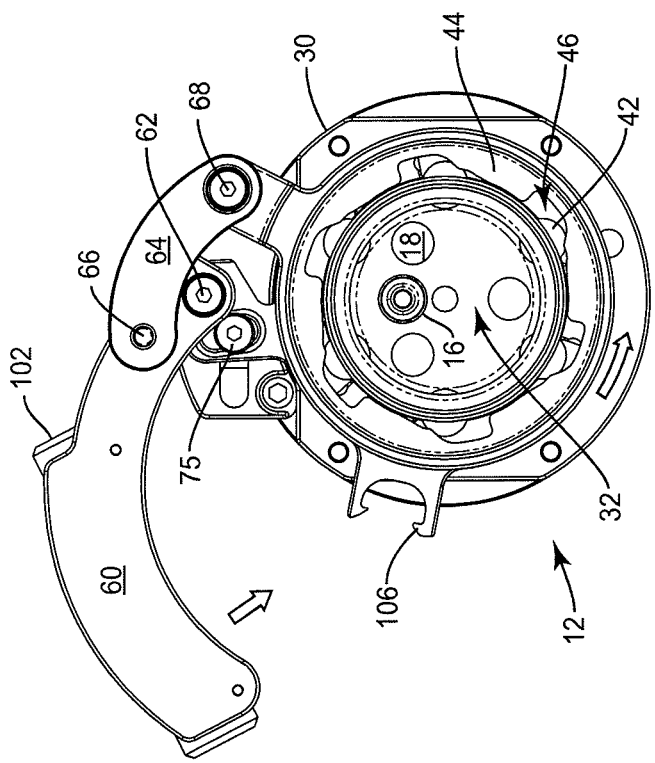
Figure 4B:
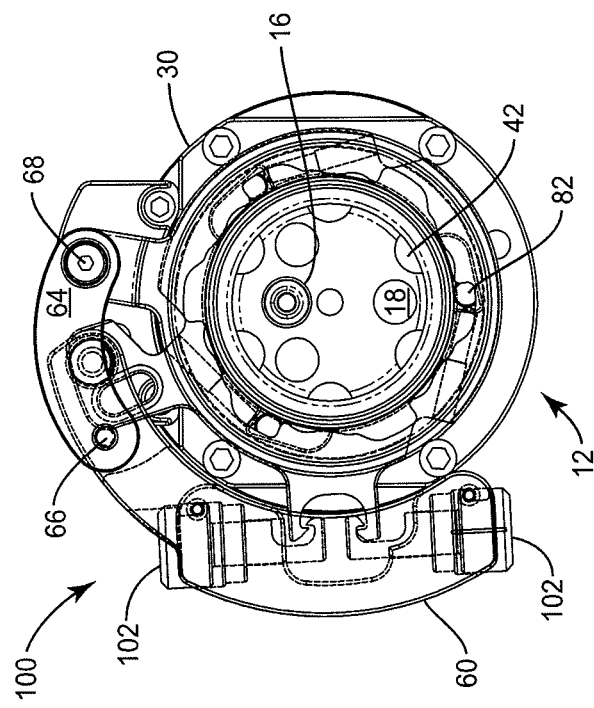
FIGS. 4A and 4B are horizontal sectional views of the master unit of FIG. 3 in a coupled position.
Figure 4A:
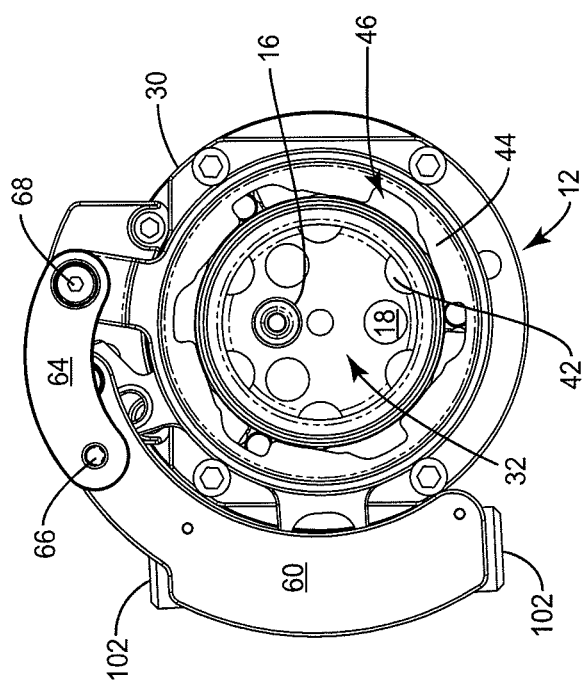

FIGS. 3A, 3B, 4A, and 4B depict the action of the rotating cam surface ring 44 on the ball members 42. FIGS. 3A and 3B depict the ball members 42 in a fully retracted (decoupled) position, in which they are retracted within their respective holes 40. In this position, the ball members 42 are just flush with, or are slightly retracted from, the central chamber 32, allowing the column 34 of a tool unit 14 to freely move into the chamber 32. Also in this position, each ball member 42 rests against the nesting surface 48 of the rotating cam surface ring 44. As the handle 60 is actuated in the direction indicated, the rotating cam surface ring 44 rotates in the direction indicated (counter-clockwise as depicted in FIGS. 3A, 3B, 4A, and 4B), moving the ball members 42 from retracted to extended positions. FIGS. 4A and 4B depict the ball members 42 in a fully extended (coupled) position, in which they extend into the chamber 32 to engage a tool unit 14. In this position, each ball member 42 is pressed inwardly by the locking surface 56.

A handle 60 is pivotally attached to a drive ring 72 at a first pivot pin 62. The handle is also pivotally attached to a handle linkage member 64 by a second pivot pin 66. The handle linkage member 64 is attached to the rotating cam surface ring 44 by a third pivot pin 68. As explained more fully below, to initially insert a tool unit 14 into the chamber 32, the handle 60 must be urged to the fully open position. When this force on the handle 60 is released, the drive ring 72 rotates slightly in a counter-clockwise direction. Additionally, the handle linkage member 64 is moved in a counter-clockwise direction, which in turn actuates the rotating cam surface ring 44 counter-clockwise, as indicated by the directional arrow. As the handle 60 is then moved further towards the closed position, the rotating cam surface ring 44 continues to rotate in a counter-clockwise direction. The position of the second pivot pin 66 relative to the first pivot pin 62 provides an "over center" mechanical advantage, multiplying the rotational force applied to the rotating cam surface ring 44 as the handle 60 is closed. It also moves the rotating cam surface ring 44 through a greater degree of rotation than the drive ring 72.

As the rotating cam surface ring 44 rotates, each ball member 42 is engaged successively by distinct surfaces 48-56 of the corresponding recess 46 (described below). Engagement with these surfaces 48-56 force the ball members 42 to an extended position in which they protrude at least partially into the central chamber 32, engaging the coupling surface 38 of the column 34 of a tool unit 14, when it is positioned within the chamber 32.

FIGS. 4A and 4B depict the master unit 12 in a coupled state, with the ball members 42 in an extended (coupled) position, forced into the chamber 32 by actuation of the rotating cam surface ring 44. In one embodiment, the rotating cam surface ring 44 rotates through approximately 10° in moving from the decoupled position of FIGS. 3A and 3B to the coupled position of FIGS. 4A and 4B.

Figure 5:
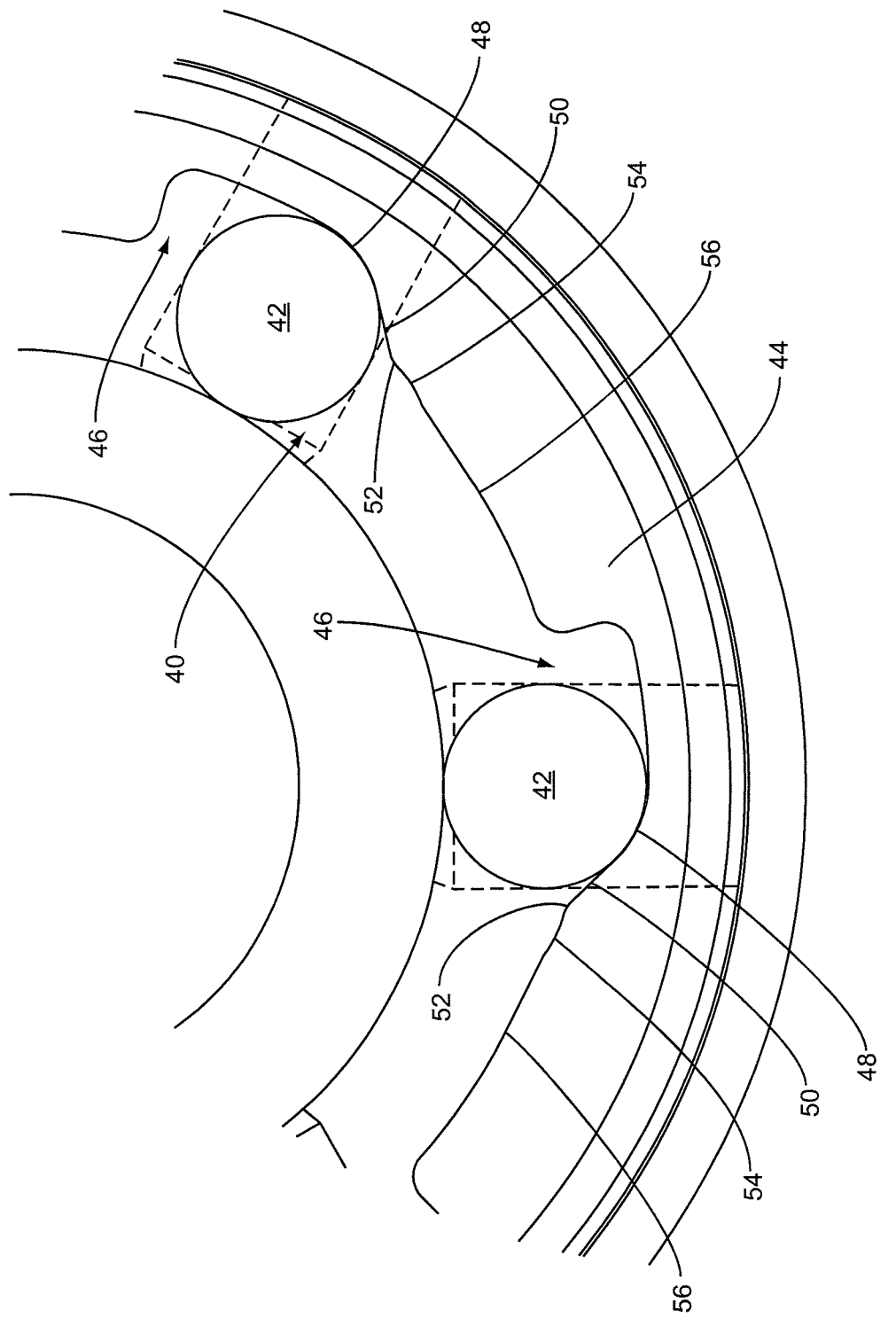
FIG. 5 is an enlarged sectional view of a rotating cam surface ring and ball members in an extended position.

FIG. 5 depicts a partial sectional view showing two ball members 42, each in a fully retracted (decoupled) position, with no portion of a ball member 42 surface protruding past the inner surface of the chamber 32. The dotted lines depict the holes 40 within which each ball member 42 resides. In this position, each ball member 42 contacts the nesting surface 48 of a corresponding recess 46 in the rotating cam surface ring 44. The rotating cam surface ring 44 is in the uncoupled position, in which the master and tool units 12, 14, may be separated.

As the rotating cam surface ring 44 rotates in a counter-clockwise direction, each actuating surface 50 displaces the corresponding ball member 42 inwardly towards the center of the chamber 32. Assuming that a tool unit 12 is abutting the master unit 14, with the column 34 disposed within the chamber 32, as the ball members 42 move inwardly, each will come into contact with the coupling surface 38 of the collar 34 on the tool unit 14, as best seen in FIG. 2. As the cam surfaces 48-56 of each recess 46 press the corresponding ball member 42 inwardly, the resultant force exerted on the coupling surface 38 may be decomposed into two vector components: a force directed inwardly in the direction of the movement of the ball member 42, and a force directed downwardly, in the direction of the master unit 12. This second force locks the tool unit 14 to the master unit 12.

Figure 6:
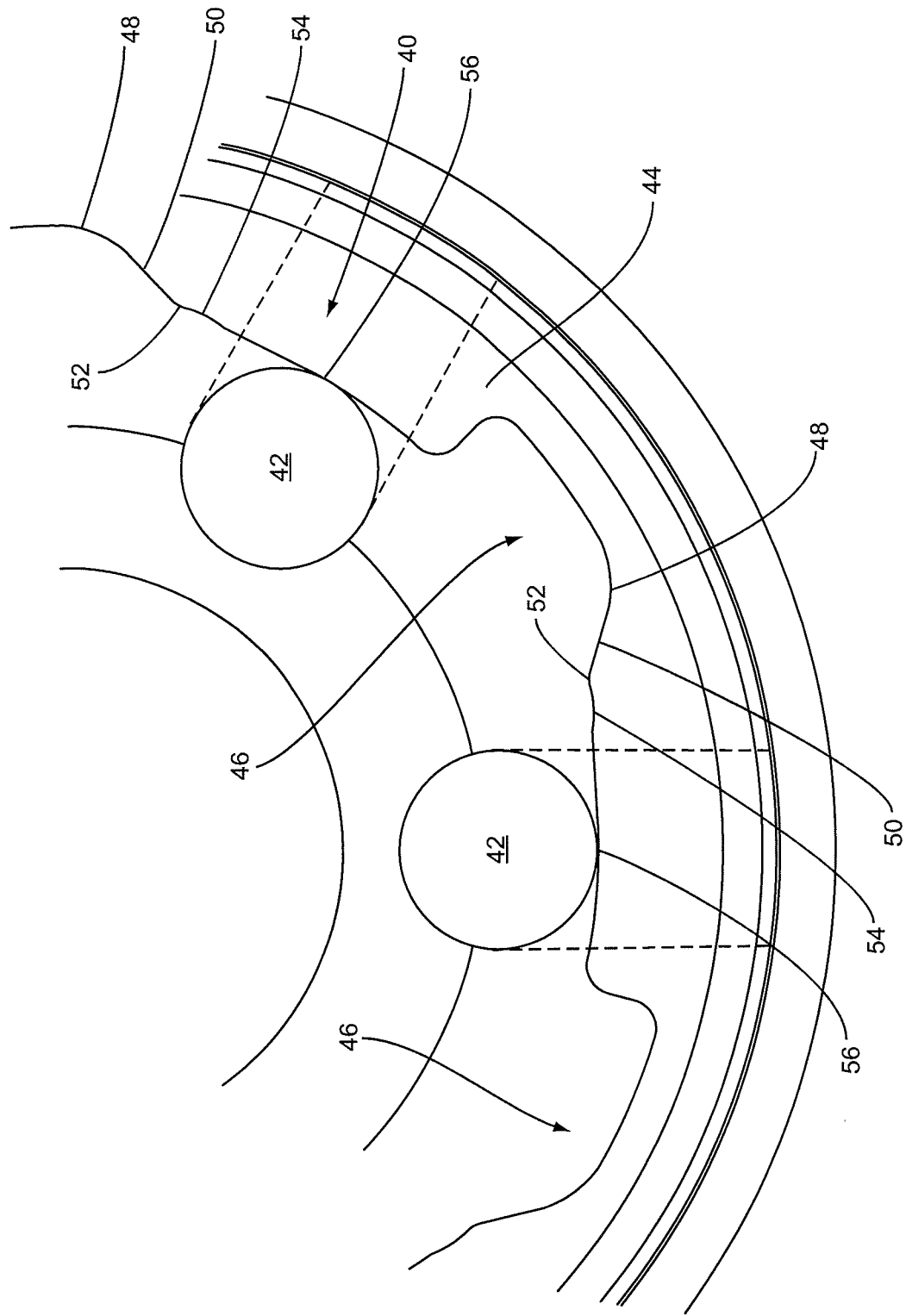
FIG. 6 is an enlarged sectional view of the rotating cam surface ring and ball members in a retracted position.

The rotating cam surface ring 44 continues its rotation in a counter-clockwise direction until each locking surface 56 contacts a corresponding ball member 42, as depicted in FIG. 6. The locking surface 56 presses the ball member 42 tightly against the coupling surface 38 of the tool unit 14 (see FIG. 2). Note that the locking surface 56 extends furthest inward of any surface 48-56 of the recess 46, thus pressing the ball member 42 against the coupling surface 38 with the maximum force. The rotating cam surface ring 44 assumes and maintains the position depicted in FIG. 6 when the master and tool units 12, 14 are coupled together and the handle 60 is moved to the fully closed, or coupled, position (as depicted in FIG. 4).

Safety is always a major concern in robotics. If the handle 60 were to be released from its fully closed position, or in other embodiments in which the rotating cam surface ring 44 is actuated by, e.g., pneumatic pressure, which were to fail, the force of the ball member 42 pressing on the locking surface 56 may urge the rotating cam surface ring 44 in a clockwise direction, releasing pressure exerted through the ball members 42 onto the coupling surface 38 of the tool unit 14. If the rotating cam surface ring 44 were to rotate in this direction to the position depicted in FIGS. 3A and 3B, the ball members 42 may completely disengage the coupling surface 38, allowing the tool unit 14 to decouple from the master unit 12, with potentially disastrous results.

Figure 7:
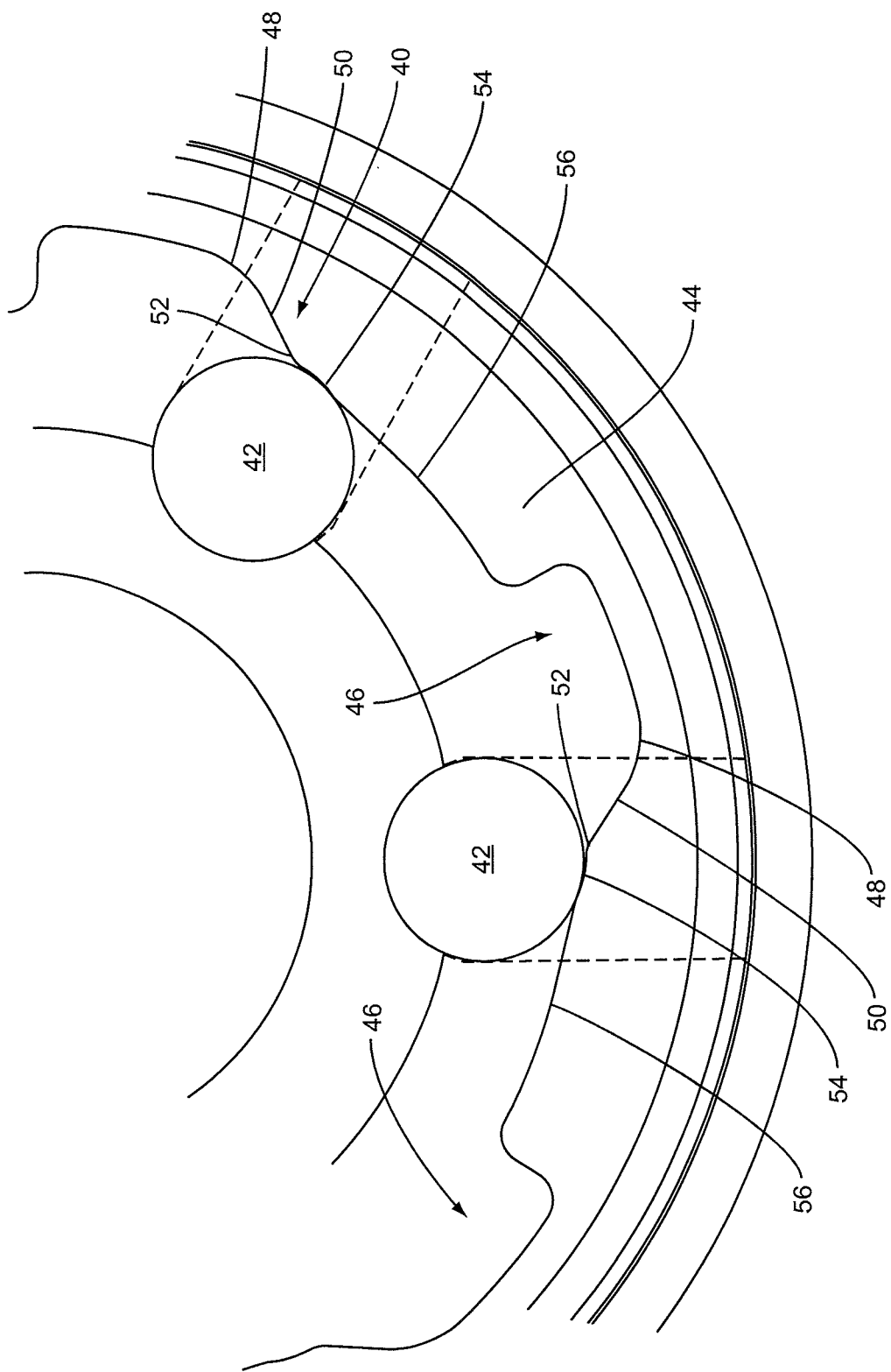
FIG. 7 is an enlarged sectional view of the rotating cam surface ring and ball members in a failsafe position.

To help prevent this possibility, each recess 46 of the rotating cam surface ring 44 includes a failsafe surface 54 and optionally a failsafe lobe 52. FIG. 7 depicts a master unit 12 having experienced a loss of actuating power or mechanical lock, and wherein the ball members 42 have urged the rotating cam surface ring 44 slightly in a clockwise direction. As best seen in FIG. 5, the failsafe surface 54 includes a slight recess or ball retention chamber, formed by intersecting slopes from the failsafe lobe 52 and the locking surface 56. This recess tends to cradle the ball member 42. In this position (FIG. 7), the ball member 42 presses outwardly against the rotating cam surface ring 44; however, this force does not induce any torque on the rotating cam surface ring 44 since it presses equally on the failsafe lobe 52 and the locking surface 56 slopes. This prevents the rotating cam surface ring 44 from further clockwise rotation, maintaining a safe, coupled state between the master and tool units 12, 14.

In one embodiment (not shown), the failsafe surface 54 may simply comprise a flat surface, tangential to the axis of the chamber 32, interposed between the actuating surface 48 and the locking surface 56. The resultant force exerted on the ball members 42 by the coupling surface 38 is may be decomposed into vector components directed outwardly and toward the tool unit 14 (i.e., upwardly, as depicted in FIG. 2). Only the outwardly directed component of this force is exerted by the ball members 42 on the rotating cam surface ring 44. Accordingly, the ball member 42 does not exert any component of force in a "side," or circumferential direction that can induce a torque on, or rotation of, the rotating cam surface ring 44 in a clockwise, or unlocking, direction. Hence a tangentially flat failsafe surface 54, normal to the force exerted by the ball member 42, is sufficient to ensure that the ball members 42 cannot urge the rotating cam surface ring 44 to a decoupled position (FIG. 3) in the event of a power loss or mechanical failure of the handle 60.

However, many parasitic forces are present in robotic environments, including vibration, inertial forces induced by movement of the robotic arm, and the like. To provide an even more effective failsafe design that can withstand the effect of such parasitic forces, the embodiment of the rotating cam surface ring 44 depicted in FIGS. 5-8 includes a failsafe lobe 52 that not only disallows the ball members 42 to urge the rotating cam surface ring 44 to a decoupled position (FIGS. 3A and 3B), but further requires the active application of a non-trivial amount of torque to the rotating cam surface ring 44 to pass the failsafe lobe 52 and reach the decoupled position.

Figure 8:
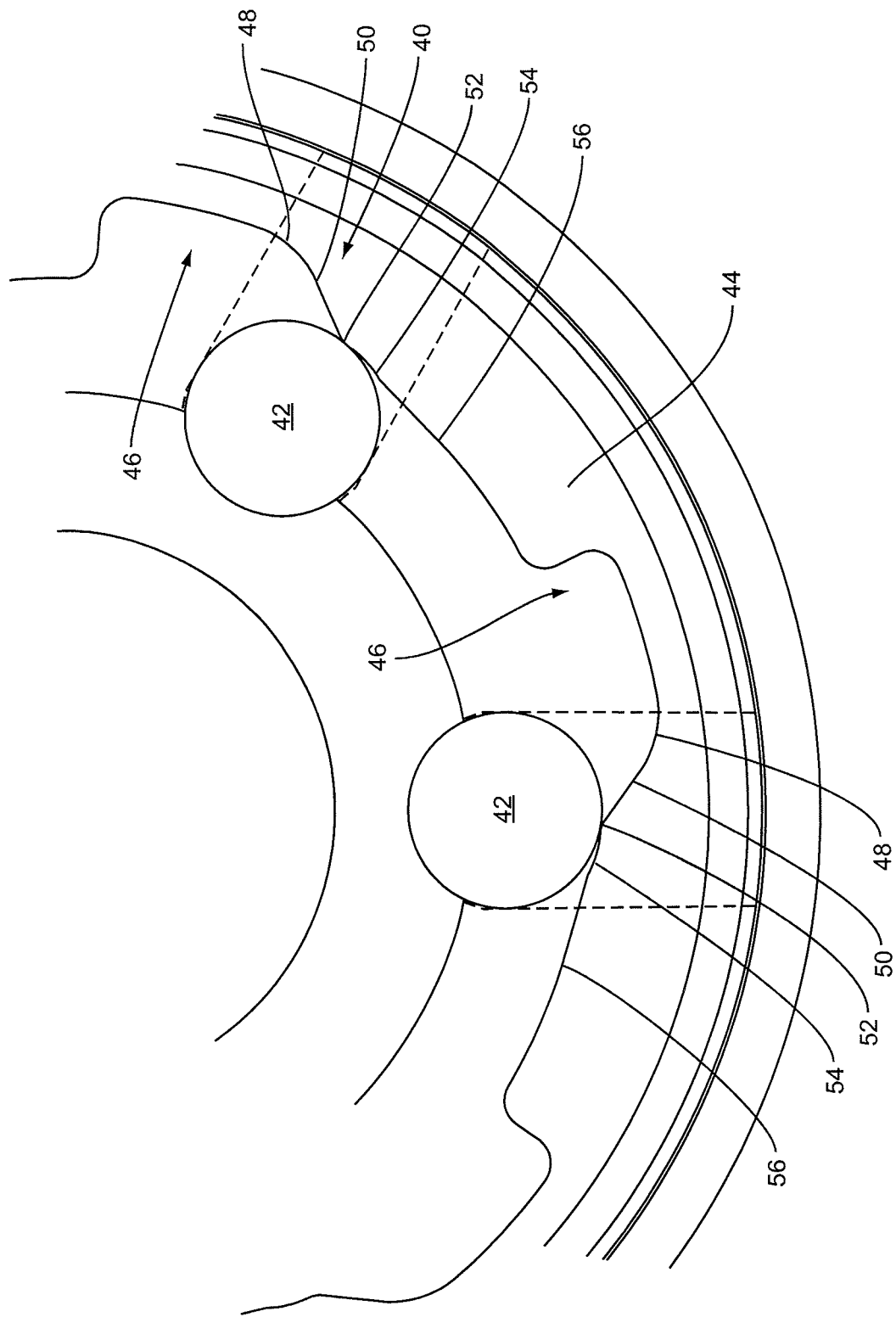
FIG. 8 is an enlarged sectional view of the rotating cam surface ring and ball members crossing a failsafe lobe.

As best seen in FIG. 8, in moving from the coupled to decoupled position, the ball members 42 are allowed to recess slightly as the point of contact moves from the locking surface 56 to the failsafe surface 54. The ball members 42 must then be forced back out into a more extended position to clear the failsafe lobe 52, as depicted in FIG. 8. The torque required to rotate the rotating cam surface ring 44 from the position depicted in FIG. 7 to that depicted in FIG. 8 exceeds any force that may be induced on the rotating cam surface ring 44 by parasitic forces.

In one embodiment, to further enhance safety and prevent an inadvertent release of a tool unit 14, an actuating mechanism 70 automatically partially actuates the master unit 12 toward the coupled position, partially engaging the tool unit 14, in a default state when no force is exerted on the handle 60. The actuating mechanism 70 achieves this partial engagement by rotating the rotating cam surface ring 44 through some of the distance between the decoupled (retracted) position of FIGS. 3A and 3B to the coupled (extended) position of FIGS. 4A and 4B, using the bias force of a spring 78. In this embodiment, an active force must be applied to the handle in the opening, or decoupling, direction to overcome the spring bias and fully retract the ball members 42, to release a tool unit 14.

Figure 9:
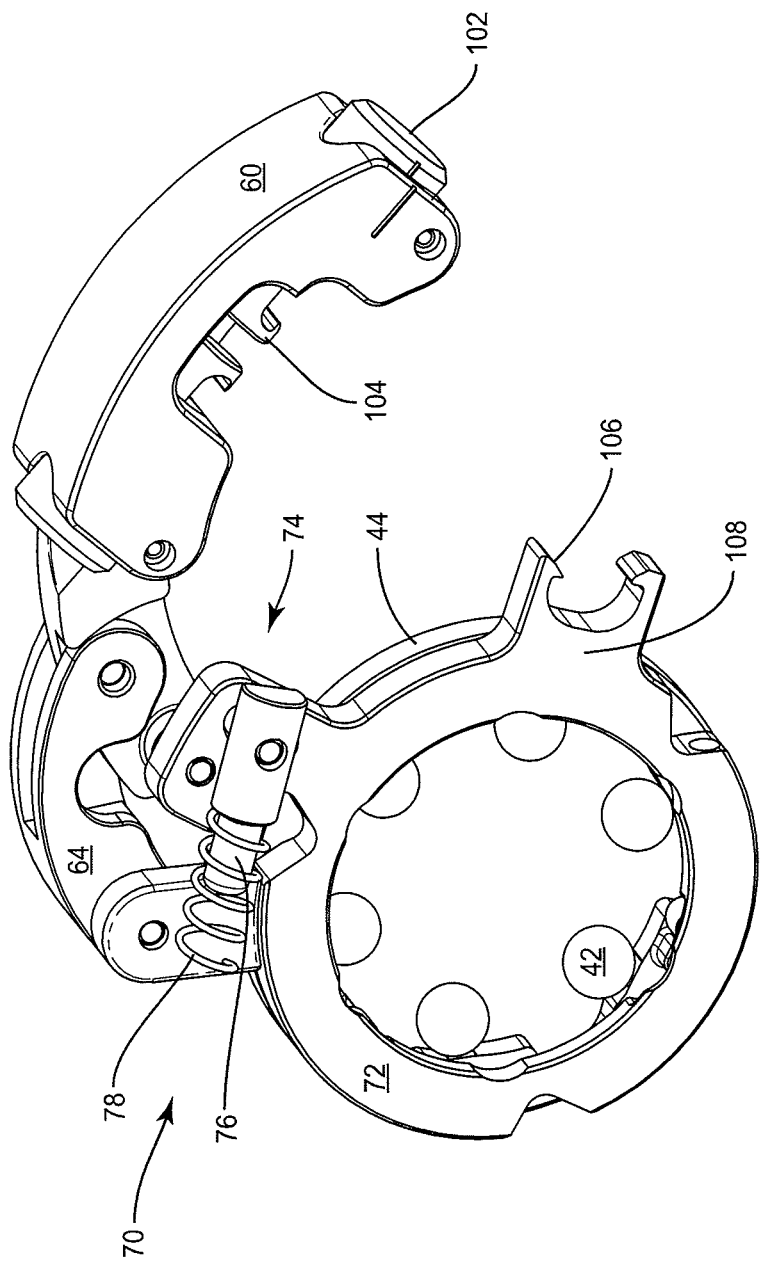
FIG. 9 is a partial exploded perspective view of an actuating mechanism, with the rotating cam surface ring and ball members in a partially coupled position.

FIG. 9 depicts the actuating mechanism 70 and its relation to the rotating cam surface ring 44 and handle 60. Note that the depiction in FIG. 9 is from "below" the actuating mechanism 70; accordingly, the direction of rotation of the rotating cam surface ring 44 is opposite that described elsewhere herein, with reference to other drawing figures.

The actuating mechanism 70 comprises a drive ring 72 and an actuating driver assembly 74. As discussed above, the drive ring 72 is attached to the handle 60, and the rotating cam surface ring 44 is connected to the handle linkage member 64. The drive ring 72 is attached to the actuating driver assembly 74 by a pin-in-slot arrangement 75, as best seen in FIGS. 3A and 3B. This mechanical coupling between the drive ring 72 and the actuating driver assembly 74 accommodates the radial component of relative motion between the drive ring 72 and the actuating driver assembly 74 as the drive ring 72 rotates.

The actuating driver assembly 74 (FIG. 9) comprises, in the embodiment depicted, a rod 76 and a spring 78. The rod 76 is attached to the drive ring 72 by the pin-in-slot coupling 75 discussed above. The coupling 75 operates such that as the rod 76 moves linearly to the right, the drive ring 72 rotates toward the coupled position (i.e., clockwise as depicted in FIG. 9). The spring 78, affixed to the rod 76 at one end and against the housing 30 at the other end, biases the rod 76 to the right, and hence also the drive ring 72, towards the coupled position.

The spring 78 is compressed as the handle 60 is moved to the fully open position. The bias force of the spring 78 thus must be overcome by forcing the handle 60 fully open to release a tool unit 14. When the force on the handle is released (or not applied, such as if the handle were to open inadvertently), the spring 78 drives the actuating mechanism 70 to rotate the drive ring 72 and hence, through the handle linkage, the rotating cam surface ring 44, at least slightly towards the coupled position. In particular, the rotating cam surface ring 44 is rotated sufficiently to extend the ball members 42 partially into the chamber 32, preventing a tool unit 14 from disengaging with the master unit 12. The handle 60 must be forced (and held) against the bias of the spring 78 to achieve a fully open position, both to remove a tool unit 14 and also to engage a different tool unit 14 with the master unit 12.

A further safety feature, according to one embodiment, is a one-way clutch mechanism that allows the drive ring 72 to turn in only the coupling direction, unless and until released by actuation of the handle 60. FIG. 10A depicts a sectional view of the master unit 12, and FIG. 10B depicts a detail of the one-way clutch mechanism 80. The clutch mechanism 80 comprises a plurality of clutch rolling members 82, each disposed within a corresponding restricting slot 84 formed in the drive ring 72. Each clutch rolling member 82 may comprise a ball or a cylinder (oriented vertically as depicted in FIGS. 10A and 10B). A ball 82 provides a point contact with the sides of the restricting slot 84; a cylinder 82 provides a line of contact. The restricting slot 84 is just wider than the clutch rolling member 82 at one end (where the clutch rolling member 82 is depicted in FIG. 10) and narrows slightly in width along its extent, to slightly smaller than the diameter of the clutch rolling member 82. The narrow end of the restricting slot 84 is in the direction of motion for coupling the tool changer 10.

As the drive ring 72 moves in the counter-clockwise direction (towards the coupled position), the clutch rolling members 82 move to the wide end of the respective restricting slots 84, allowing the drive ring 72 to rotate towards the coupled position. That is, the direction of motion of the restricting slot 84 relative to the clutch rolling member 82 is to displace the clutch rolling members 82 toward the wide end of the restricting slot 84. However, if the drive ring 72 attempts to rotate in the clockwise direction (towards the uncoupled position), each clutch rolling member 82 moves towards the narrow end of its respective restricting slot 84, where it will create an interference fit, or "wedge," preventing the drive ring 72 from rotating in the clockwise direction.

To ensure this interference fit preventing clockwise rotation, each clutch rolling member 82 is forced within its restricting slot 84 toward the narrow end, to the point of "binding," by a spring 88 and detent ball 90. The force of the spring 88 may be adjusted, e.g., by a set screw 92 in a threaded hole formed in the housing 30 of the master unit 12. The one-way clutch mechanism 80 thus prevents the drive ring 72, and hence, the handle 60, from rotation in the direction of decoupling the tool changer 10.

Figure 11:
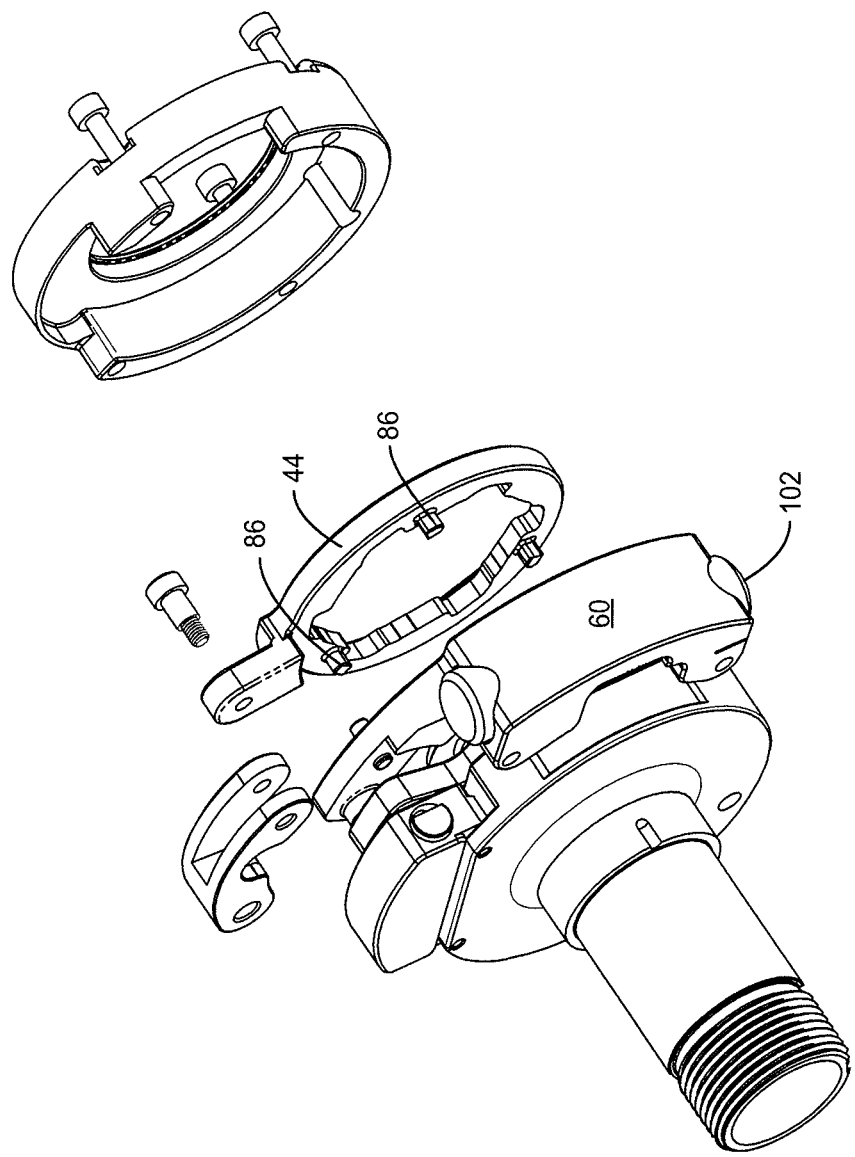
FIG. 11 is a partial exploded perspective view of the master unit of FIG. 3, showing the underside of a cam surface ring.

Of course, the one-way clutch mechanism 80 must be disengaged to intentionally decouple the tool changer 10. As depicted in FIG. 11, a plurality of posts 86 protrude from the lower side of the cam surface ring 44. The posts 86 are slightly narrower in diameter than the width of each restricting slot 84 at its narrow end. The posts 86 are positioned on the cam surface ring 44 such that each post 86 is disposed within a restricting slot 84 (towards the narrow end of the slot 84) beside a clutch rolling member 82. As the handle 60 is disengaged from the locked position of FIGS. 4A and 4B, the rotating cam surface ring 44, attached by the handle linkage member 64, rotates in a clockwise direction. Due to the "over center" operation of the handle linkage member 64, the rotating cam surface ring 44 rotates clockwise to at least a slight degree prior to the drive ring 72 (pivotally attached directly to the handle 60) begins to rotate in a clockwise direction. This brings the posts 86 (rigidly attached to the rotating cam surface ring 44) into contact with the clutch rolling members 82, forcing them into the wide end of the restricting slot 84. Each post 86 forces the corresponding clutch rolling member 82 against a detent ball 90, compressing the spring 88, and moving the clutch rolling member 82 to the wide end of the restricting slot 84. This releases the "binding" action of the interference fit between the clutch rolling member 82 and the narrow side walls of the restricting slot 84, allowing the drive ring 72 to rotate in a clockwise direction to decouple the tool changer 10.

Another safety feature of one embodiment of the present invention is a dual-button handle locking mechanism 100, as depicted in FIGS. 3A, 3B, 4A, and 4B. The locking mechanism 100 comprises two oppositely-oriented latch buttons 102, each actuating a locking tooth 104. The locking teeth 104 engage with corresponding locking hooks 106 on a locking tab 108 affixed to the drive ring 72 (see FIG. 9). As the handle 60 is moved to the fully coupled position, as depicted in FIGS. 4A and 4B, beveled edges of the locking teeth 104, act against corresponding beveled edges of the locking hooks 106. The continuing motion of handle 60 further causes the latch buttons 102 to actuate inwardly, allowing the locking teeth 104 to engage with, and lock against, the locking hooks 106.

From the locked position depicted in FIGS. 4A and 4B, both latch buttons 102 must be actuated simultaneously to disengage the locking teeth 104 from the locking hooks 106 to allow the handle 60 to move towards the decoupled position. If only one latch button 102 is actuated—for example, by inadvertent contact with an object—the handle 60 will remain locked in the coupled position.

The dual-button handle locking mechanism 100 is particularly well suited for a robotic surgical application. The mechanism 100 may be easily actuated with one hand. Additionally, in the surgical environment, mechanical apparatuses are typically shrouded in plastic or other sanitary barrier, to create and preserve a sanitary environment. The positioning of the dual latch buttons 102 in opposing directions makes the locking mechanism 100 easy to actuate, even beneath one or more layers of plastic or other shrouding material.

Embodiments of the tool changer 10 described herein offer several unique and valuable features. Due to the rotating cam arrangement, as opposed to a piston-actuated cam surface, the tool changer 10 is very compact and lightweight, and may be particularly suited for fabrication in a small form factor. Furthermore, the shape of the tool 14 and single piece construction allows for easy sanitary washdown processes.

Embodiments of the tool changer 10 described herein include numerous safety features preventing the inadvertent decoupling of a master unit 12 and tool unit 14. The failsafe surface 54 and failsafe lobe 52 prevent the inherent pressure of the coupling mechanism from moving the tool changer 10 to a decoupled state in the event of loss of actuating pressure. The one-way clutch mechanism 80 prevents movement of the drive ring 72 towards the decoupled position unless specifically urged in that direction by the posts 86. The dual-button handle locking mechanism 100 retains the tool changer 10 in the coupled position unless actuated, and is inherently safe against accidental actuation. Even after the dual-button handle locking mechanism 100 is actuated and the handle 60 moved to the decoupled position, the spring 78 of the actuating mechanism 70 halts movement of the master unit 12 just short of a fully decoupled, requiring force on the handle in the decoupling direction to fully release the tool unit 14.

As used herein, the terms "extended" and "retracted" refer to the positions of the ball members 42 within the holes 40 in the master unit housing 30. The extended position corresponds to the "coupled" position of the rotating cam surface ring 44, the handle 60, and/or the tool changer 10 generally. Similarly, the retracted position of the ball members 42 corresponds to the "decoupled" position of the rotating cam surface ring 44, the handle 60, and/or the tool changer 10 generally.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention.

For example, the ball members 42 and/or rotating cam surface ring 44 may be disposed in the tool unit 14, and the coupling surface 38 may be disposed in the master unit 12. Furthermore, the rotating cam surface ring 44 may urge the ball members 42 outwardly rather than inwardly.

In general, a wide variety of variations may be devised by those of skill in the art, given the teachings of the present disclosure. The present embodiments are therefore to be construed in all aspects as illustrative and not restrictive and all changes coming within the meaning and equivalency range of the appended claims are intended to be embraced therein.

What is claimed is:

1. A manual robotic tool changer, comprising:
   a first unit operative to be attached to one of a robot and a robotic tool;
   a second unit operative to be attached to the other of the robot and a robotic tool, and further operative to be selectively coupled to and decoupled from the first unit;
   a plurality of ball members disposed in the first unit;
   a rotating cam surface ring disposed in one of the units and operative to engage the ball members in the first unit and to urge the ball members, by rotational movement of the rotating cam surface ring, against a coupling surface of the second unit to lock the first and second units together;
   a handle operative to rotate the cam surface ring to couple and decouple the first and second units; and
   a one-way clutch mechanism operative to allow rotation of the cam surface ring in the coupling direction and to restrict rotation of the cam surface ring in the decoupling direction unless by actuation of the handle.

2. The tool changer of claim 1 wherein the one-way clutch mechanism comprises a rolling member disposed in a restricting slot formed in a rotating member, the restricting slot comprising side walls spaced apart greater than the diameter of the rolling member at one end, and less than the diameter of the rolling member at the other end.

3. The tool changer of claim 2 wherein the restricting slot is oriented such that the narrow end of the restricting slot is towards the direction of rotation to couple the first and second units together.

4. The tool changer of claim 3 wherein the one-way clutch mechanism further comprises biasing means to force the rolling member against the narrowing restricting slot side walls to cause an interference fit preventing rotation of the rotating member.

5. The tool changer of claim 4 further comprising wherein rotating member in which the restricting slot is formed is a drive ring connected to the handle, and wherein the handle connects to the rotating cam surface ring via a handle linkage member, such that when the handle is moved to couple or decouple the first and second units, the rotating cam surface ring rotates to a greater degree than does the drive ring.

6. The tool changer of claim 5 further comprising a post formed on the rotating cam surface ring and disposed within the restricting slot beside the rotating member on the side of the narrow end of the restricting slot, the post being operative to contact the rotating member and move the rotating member toward the wide end of the restricting slot when the handle is moved in a direction to decouple the first and second units, so as to relieve the interference fit between the rolling member and the restricting slot side walls.

7. The tool changer of claim 3 wherein the biasing means comprises a spring.

8. The tool changer of claim 1 further comprising a dual-button handle locking mechanism operative to lock the handle to the tool changer when the first and second units are coupled together, and requiring actuation of two latch buttons to release the handle to allow the first and second units to decouple.

9. The tool changer of claim 8 wherein the two latch buttons are disposed in opposite directions and actuated by pressing them together.

10. The tool changer of claim 8 wherein each latch button actuates a locking tooth on the handle to disengage with a corresponding locking tab on the first unit to unlock the handle from the tool changer.

11. The tool changer of claim 10 wherein the locking teeth and locking tabs each include a beveled surface operative to actuate the two latch buttons so as to lock the handle to the tool changer when the handle is pressed against the tool changer when the first and second units are coupled together.

12. The tool changer of claim 8 wherein the dual-button handle locking mechanism comprises
two latch buttons disposed on the handle in opposite directions, the latch buttons operative to be actuated by pressing them together;
a locking tooth connected to each latch button; and
two locking tabs connected to the first unit and operative to engage the locking teeth when the handle is pressed against the first unit so as to prevent the handle moving without actuation of both latch buttons to disengage the locking teeth from the locking tabs.

13. The tool changer of claim 12 wherein the locking teeth and locking tabs each include a beveled surface operative to actuate the two latch buttons so as to lock the handle to the tool changer when the handle is pressed against the tool changer when the first and second units are coupled together.

14. The tool changer of claim 12 further comprising a spring operative to bias the handle to a partially closed position when no force is applied to the handle, the partially closed position sufficient to retain the second unit coupled to the first unit.

15. The tool changer of claim 14 wherein the handle must be moved to a fully open position against the bias of the spring in order to fully decouple the first and second units.

16. The tool changer of claim 1 further comprising a spring operative to bias the rotating cam surface ring to a partially coupled position when no force is applied to the handle, the partially coupled position sufficient to retain the second unit coupled to the first unit.

17. The tool changer of claim 16 wherein the handle must be moved to a fully open position against the bias of the spring in order to fully decouple the first and second units.

18. The tool changer of claim 1 further comprising a kinematic mount between the first and second units operative to provide a high repeatability in relative alignment between the first and second units in successive coupling operations.

19. The tool changer of claim 18 wherein the kinematic mount comprises three ball members rigidly affixed to one of the first and second units and three corresponding concave surfaces formed in the other of the first and second units.

20. The tool changer of claim 1 further comprising an alignment pin disposed on one of the first and second units, and a corresponding alignment hole on the other of the first and second units, the alignment pin being of sufficient length to allow a user to orient the position of the second unit relative to the first unit without visual assistance.

21. A manual robotic tool changer, comprising:
a first unit including a coupling mechanism moveable along an extent between decoupled and coupled positions;
a handle attached to the first unit and operative to activate the coupling mechanism;
a second unit operative to be selectively coupled to the first unit by manual actuation of the handle; and
a one-way clutch mechanism in the coupling mechanism operative to allow the coupling mechanism to freely move along its extent in a direction toward the coupled position and to restrict the coupling mechanism from any movement along its extent in a direction toward the decoupled position unless by actuation of the handle.

22. The manual robotic tool changer of claim 21, further comprising:
a dual-button handle locking mechanism comprising
two latch buttons disposed on the handle in opposite directions, the latch buttons operative to be actuated by pressing them together,
a locking tooth connected to each latch button, and
two locking tabs connected to the first unit and operative to engage the locking teeth when the handle is pressed against the first unit so as to prevent the handle moving without actuation of both latch buttons to disengage the locking teeth from the locking tabs.

* * * * *